United States Patent
Siebel et al.

(10) Patent No.: US 7,295,903 B2
(45) Date of Patent: Nov. 13, 2007

(54) DEVICE AND METHOD FOR ON-BOARD DIAGNOSIS BASED ON A MODEL

(75) Inventors: Ulrich Siebel, Berlin (DE); Frank Henecker, Lenting (DE); Andreas Breuer, Brockel (DE)

(73) Assignees: Audi AG, Ingolstadt (DE); Volkswagenwerk AG, Wolfsburg (DE)

( * ) Notice: Subject to any disclaimer, the term of this patent is extended or adjusted under 35 U.S.C. 154(b) by 0 days.

(21) Appl. No.: 10/546,363

(22) PCT Filed: Jan. 14, 2004

(86) PCT No.: PCT/EP2004/000189
§ 371 (c)(1),
(2), (4) Date: May 24, 2006

(87) PCT Pub. No.: WO2004/074955
PCT Pub. Date: Sep. 2, 2004

(65) Prior Publication Data
US 2006/0271256 A1 Nov. 30, 2006

(30) Foreign Application Priority Data
Feb. 21, 2003 (DE) .............................. 103 07 342

(51) Int. Cl.
*G06F 7/00* (2006.01)

(52) U.S. Cl. .................. 701/29; 701/35; 340/438; 340/439

(58) Field of Classification Search .................. 701/1, 701/29, 35; 340/425.5, 438, 439
See application file for complete search history.

(56) References Cited

U.S. PATENT DOCUMENTS

| | | | |
|---|---|---|---|
| 5,541,840 A | * | 7/1996 | Gurne et al. .................. 701/33 |
| 5,957,985 A | | 9/1999 | Lee et al. |
| 6,246,950 B1 | | 6/2001 | Azzaro et al. |

FOREIGN PATENT DOCUMENTS

| | | |
|---|---|---|
| DE | 100 51 781 | 4/2002 |
| DE | 100 56 413 | 5/2002 |

* cited by examiner

Primary Examiner—Gertrude A. Jeanglaude
(74) Attorney, Agent, or Firm—Stevens, Davis, Miller & Mosher, LLP

(57) ABSTRACT

The aim of the invention is to improve the diagnosis of motor vehicle systems comprising a plurality of functional components in a network. To this end, the individual status data of the control units (11, 12, 13, 14) is monitored in a central diagnostic control unit (15) using a mathematical model. Each control unit can also be provided with a self-diagnosis optionally based on a model. By calculating error or causes of error using a model, the control units do not need to be provided with large databases for the diagnosis of error.

13 Claims, 2 Drawing Sheets

DEVICE AND METHOD FOR ON-BOARD DIAGNOSIS BASED ON A MODEL

This application is a § 371 application of PCT/EP2004/000190, which claims priority from DE 10307342.6, filed Feb. 21, 2003.

BACKGROUND

This invention relates to a device for on-board diagnosis, especially for a motor vehicle system which has a plurality of functional components which are networked to one another, of which at least two are control devices. Furthermore this invention relates to a corresponding method for on-board diagnosis of a system. Such on-board diagnosis can be carried out in motor vehicles, track-guided vehicles, ships, aircraft, and the like. Hereinafter the general term "vehicle" is used for this purpose.

Fault diagnosis of control devices and of the components, especially of a motor vehicle, which are controlled with them is conventionally carried out by means of self-diagnosis by the control device itself. This means that diagnosis is limited only to the control device with the respectively controlled components. If a fault is determined by self-diagnosis, a fault message is stored in the control device. Then, the fault message is retrieved in a shop using a shop tester. Since self-diagnosis relates only to one respective control device or its controlled components, component-wide or system-wide faults cannot be detected with it. But since control devices are being installed more and more in motor vehicles and are optionally networked to one another, it is increasingly important to be able to implement fault diagnosis as well in these networked systems.

The difficulty of system-wide fault diagnosis consists in that the control devices and controlled components generally originate from different manufacturers, and therefore different implementations and interpretations of specifications can occur.

A system-wide diagnosis process is known from German Published Patent Application DE 100 51 781 A1. Diagnosis takes place there in two stages, specifically component diagnosis and central system diagnosis, a system quantity and a status assigned to the system quantity being output from the component diagnosis as a result to the central system diagnosis. So-called model data of the components and of the system are stored in a function matrix. The linking of the statuses of the system quantities to operating states and the determination of faulty functions take place using a function matrix tensor. The disadvantage here is that the very extensive function matrix which would have to take into account all functional relationships of the individual components must be stored in a corresponding diagnosis device.

SUMMARY OF THE INVENTION

The object of this invention is thus to propose a simplified on-board diagnosis process and a corresponding simplified on-board diagnosis device.

This object is achieved by a device for on-board diagnosis of a vehicle system, especially a motor vehicle system, which has a plurality of functional components which are networked to one another, of which at least two are control devices, with a computing means which can be connected to a plurality of functional components by way of a connecting means, for recording and evaluation of the component data of the plurality of components, the computing means having a mathematical model with which functional relationships of the plurality of components, optionally including the connection means, can be computed so that component-wide faults and/or faults relating to the connection means can be determined in a targeted manner in the motor vehicle from the component data.

Furthermore, a process is provided for on-board diagnosis of a vehicle system, especially a motor vehicle system, which has a plurality of functional components which are networked to one another, by recording and evaluating the component data of the plurality of components, for evaluation of the component data a mathematical model being used with which functional relationships of the plurality of components, optionally including the connection means, are computer for networking of components so that component-wide faults and/or faults relating to the connection means can be determined in a targeted manner in the motor vehicle from the component data.

Model-based fault diagnosis has the advantage that overly large databases need not be stored in individual diagnosis or control devices.

Furthermore, so-called unknown fault causes can also be detected by the model-based process. These are fault causes which are not covered with the known fault codes. These fault causes can be determined by the function relationships stored in the models. For example, defective components can be inferred by finding the amount of intersection of several fault symptoms or effect relationships.

Advantageously the on-board diagnosis means centrally executes comprehensive fault diagnosis for all components, including the connection means. In this way all component-wide or system-wide faults or fault causes can be detected. Moreover, model-based fault diagnosis can also recognize multiple faults which are caused by several individual faults and which cannot be easily determined by a user. In addition, so-called event signal bursts which are caused by a single fault and which act for example on the plurality of control devices and accordingly cause numerous fault reports can also be processed or prevented by model-based central diagnosis in a targeted manner.

According to one version the component data of a plurality of components comprise status data which are not processed with respect to fault diagnosis. In one alternative version the component data comprises status data and/or fault data which have been preprocessed with respect to fault diagnosis, in the individual components self-diagnoses or preliminary stages of self-diagnoses being carried out.

The on-board diagnosis device can also have a function means for executing vehicle functions. Thus it constitutes a unit which is both a function device and also a diagnosis device. Thus, component-wide and system-wide diagnoses can also be carried out with one functional unit.

Preferably a motor vehicle system consists of a plurality of functional components which are networked to one another, and at least one model-based diagnosis device. If a plurality of the components including the connection means each have one diagnosis unit, one or more of these components can assume a diagnosis master function in order to manage or evaluate diagnosis data from other components or its own diagnosis data. The data obtained by this diagnosis master function can be routed to a continuing system diagnosis.

BRIEF DESCRIPTION OF THE DRAWINGS

The present invention will be detailed using the attached drawings, in which.

DETAILED DESCRIPTION OF THE INVENTION

The embodiments detailed below constitute preferred embodiments of the present invention.

Figure 1:
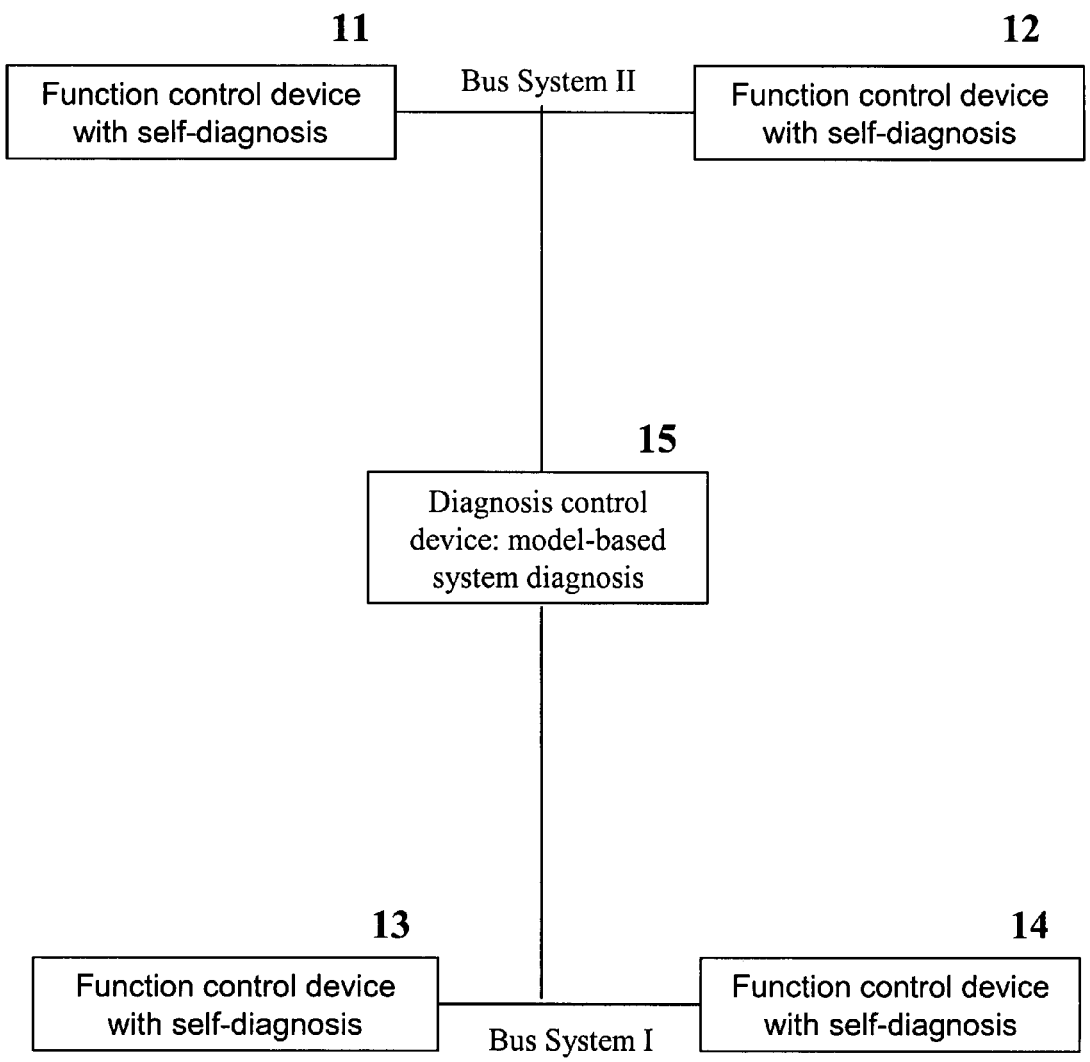
FIG. 1 shows a block diagram of a motor vehicle system according to a first embodiment of this invention.

FIG. 1 shows a block diagram of a simplified motor vehicle system. The motor vehicle system comprises four function control devices 11, 12, 13, and 14 and one diagnosis control device 15. The function control devices 11 and 12 are connected to the diagnosis control device 15 by way of a bus system II. The function control devices 13 and 14 are conversely connected to the diagnosis control device 15 by way of a bus system I.

The function control devices 11 to 14 each have a self-diagnosis function. The error reports of the individual function control devices 11 to 14 obtained by self-diagnosis are optionally sent with other stored process data by way of the respective bus system I, II to the diagnosis control device 15. A system-wide model for detection of system fault candidates runs centrally in this control device 15 which is provided for this purpose. In this embodiment therefore system-wide, model-based diagnosis is placed on the conventional self-diagnosis so that a hierarchical diagnosis system is formed.

Since not every malfunction can be recognized by self-diagnosis, process data are also sent from the function control devices 11 to 14 to the diagnosis control device 15. From a plurality of process data and error reports the diagnosis control device 15 can centrally assess, using the model, which fault cause underlies the data or at least can undertake fault location. Thus, for example, it can be established by self-diagnosis of the engine control device that the engine is sputtering and a corresponding error report is transmitted. If the diagnosis control device 15 additionally acquires process data about the fact that the engine sputtering occurs simultaneously with acceleration, the joint processing of the error report and the process data then lead to the corresponding fault cause in a much more targeted manner.

A so-called diagnosis machine is integrated into the diagnosis control device 15. The fault codes or symptoms are analyzed using this diagnosis machine which works according to the de Kleer principle of a "general diagnostic engine" or developments based thereon, in which a vehicle-specific fault diagnosis model is loaded. In the process possible fault candidates are determined.

The bus systems I and II can constitute ordinary on-board networks. As an alternative, in the motor vehicle its own diagnosis network can be connected up so that the individual function control devices have both a connection to the conventional motor vehicle bus and also a connection to a diagnosis bus. These bus systems are modeled in the diagnosis control device 15 so that the respective bus faults can also be recognized.

Figure 2:
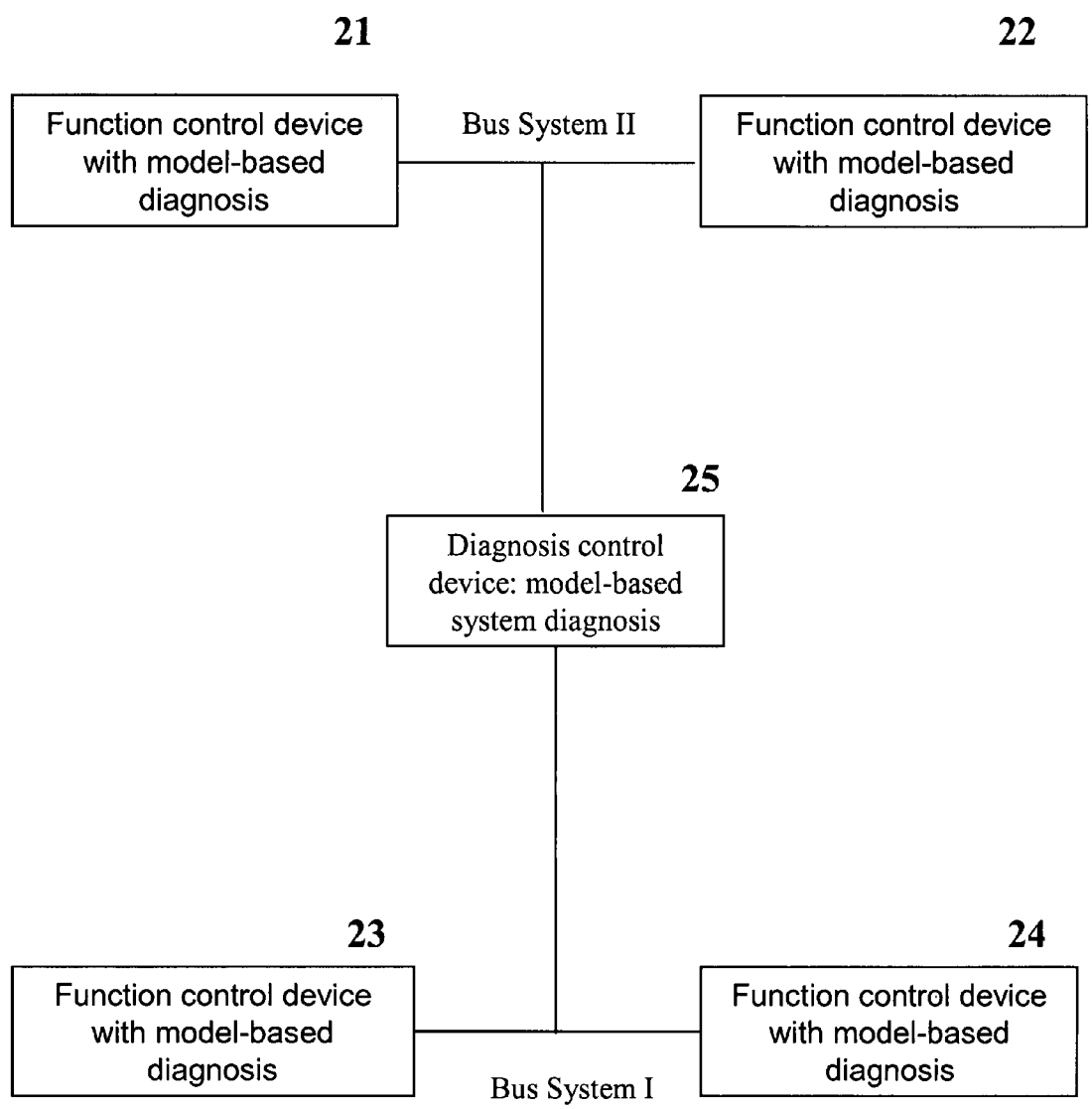
FIG. 2 shows a block diagram of a motor vehicle system according to a second embodiment of this invention.

A motor vehicle system according to a second embodiment of this invention is shown in FIG. 2. The structure of the system corresponds essentially to that of the embodiment from FIG. 1. The diagnosis control device 25 is identical to the diagnosis control device 15. The function control devices 21 to 24 in this case however have model-based self-diagnosis. This means that this system is hierarchically model-based. The component models for self-diagnosis are stored in the individual components or function control devices 12 to 24, while a fault model for system-wide diagnosis is used in the diagnosis control device 25. In other words, on the control device level, model-based diagnosis runs in each control device with which the local faults in the control device and in its periphery can be detected. To detect system faults, here the results of the control device diagnosis are also transmitted by way of the respective bus system to the diagnosis control device 25, and system fault candidates are determined using system-wide, model-based diagnosis and optionally other internal or external data, for example, other symptom information for example.

Hybrids of the embodiments as shown in FIG. 1 and FIG. 2 are also conceivable.

The invention claimed is:

1. Device for on-board diagnosis of a vehicle system, comprising a plurality of functional components which components are networked to one another, of which at least two are control devices, and
   a computing means which can be connected to a plurality of functional components by way of a connecting means, for recording and evaluation of component data generated by the plurality of components,
   wherein
   the computing means has a mathematical model with which functional relationships of the plurality of components, optionally including the connection means, can be computed so that component-wide faults and/or faults relating to the connection means can be determined in a targeted manner in the motor vehicle from the component data.

2. The device as claimed in claim 1, which can be centrally used for fault diagnosis for all of the plurality of components of the vehicle system including the connection means.

3. The device as claimed in claim 1, wherein the component data from the plurality of components comprise status data which are not processed with respect to fault diagnosis.

4. The device as claimed in claim 1, wherein the component data from the plurality of components comprises status data or fault data which have been preprocessed with respect to fault diagnosis.

5. The device as claimed in claim 1, further comprising a function means for executing a vehicle function.

6. Vehicle system with a plurality of functional components networked to one another, comprising a connection means and at least one device as claimed in claim 1.

7. The vehicle system as claimed in claim 6, wherein model-based self-diagnosis can be carried out with at least one of the plurality of components.

8. Process for on-board diagnosis of a vehicle system, said system comprising a plurality of functional components which are networked to one another, by recording and evaluating component data of the plurality of components, wherein for evaluation of the component data a mathematical model is used with which functional relationships of the plurality of components, optionally including the connection means, are computed for networking of components so that component-wide faults and/or faults relating to the connection means can be determined in a targeted manner in the motor vehicle from the component data.

9. The process as claimed in claim 8, wherein fault diagnosis is centrally carried out for all of the plurality of components.

10. The process as claimed in claim 8, wherein the component data from the plurality of components comprise status data which are not processed with respect to fault diagnosis.

11. The process as claimed in claim 8, wherein the component data from the plurality of components comprises status data or fault data which have been preprocessed with respect to fault diagnosis.

12. The process as claimed in claim 8, wherein component-wide model-based diagnosis is carried out in at least two of the plurality of components.

13. The process as claimed in claim 8, wherein model-based self-diagnosis is carried out in at least one of the plurality of components.

* * * * *